US011620825B2

(12) United States Patent
Dassa et al.

(10) Patent No.: US 11,620,825 B2
(45) Date of Patent: *Apr. 4, 2023

(54) COMPUTERIZED SYSTEM AND METHOD FOR IN-VIDEO MODIFICATION (71) Applicant: YAHOO AD TECH LLC, Dulles, VA (US)

(72) Inventors: Guy Dassa, Mamaroneck, NY (US); Whitney Zoller, Brooklyn, NY (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,074

(22) Filed: May 17, 2022

(65) Prior Publication Data

US 2022/0277562 A1 Sep. 1, 2022

Related U.S. Application Data (63) Continuation of application No. 15/967,354, filed on Apr. 30, 2018, now Pat. No. 11,341,744.

(51) Int. Cl.
*G06Q 30/02* (2012.01)
*G06T 7/60* (2017.01)
*G06T 19/00* (2011.01)
*G06V 20/20* (2022.01)
*G06Q 30/0241* (2023.01)

(52) U.S. Cl.
CPC ......... *G06V 20/20* (2022.01); *G06Q 30/0276* (2013.01); *G06T 7/60* (2013.01); *G06T 19/006* (2013.01)

(58) Field of Classification Search
None
See application file for complete search history.

(56) References Cited

U.S. PATENT DOCUMENTS 6,505,169 B1  1/2003  Bhagavath et al.
9,078,048 B1  7/2015  Gargi et al.
(Continued)

FOREIGN PATENT DOCUMENTS

EP   2819417 A1   12/2014

OTHER PUBLICATIONS

Extended European Search Report to corresponding EP application No. 19166410.1 dated Aug. 9, 2019 (9 pages).

*Primary Examiner* — Robert Bader
(74) *Attorney, Agent, or Firm* — James J. DeCarlo; Greenberg Traurig, LLP (57) ABSTRACT Disclosed are systems and methods for improving interactions with and between computers in content providing, searching and/or hosting systems supported by or configured with devices, servers and/or platforms. The disclosed systems and methods provide a novel framework for performing automatic detection of surfaces in video frames resulting in the creation of a seamless in-video ad experience for viewing users. The disclosed framework operates by leveraging available surfaces in videos to show advertisements in compliance with publisher protection, compliance and policy in a fully automatic, end-to-end solution. The disclosed framework evidences a streamlined, automatic and computationally efficient process(es) that modifies digital content at the surface level within the frames of the content in compliance with the digital rights of the owners of the content being merged via the disclosed augmentation.

20 Claims, 6 Drawing Sheets (56) References Cited

U.S. PATENT DOCUMENTS

| | | |
|---|---|---|
| 2005/0137958 A1 | 6/2005 | Huber et al. |
| 2007/0055986 A1 | 3/2007 | Gilley et al. |
| 2008/0178211 A1 | 7/2008 | Lillo et al. |
| 2009/0249386 A1 | 10/2009 | Shan et al. |
| 2011/0251896 A1 | 10/2011 | Impollonia et al. |
| 2014/0278981 A1 | 9/2014 | Mersov et al. |
| 2016/0050465 A1 | 2/2016 | Zaheer et al. |
| 2017/0374403 A1 | 12/2017 | Gupta et al. |

FIG. 4 ated as U.S. Pat. No. 11,341,744 on May 24, 2022, and entitled
COMPUTERIZED SYSTEM AND METHOD FOR IN-VIDEO MODIFICATION

CROSS REFERENCE TO RELATED APPLICATIONS

This application is a continuation of and claims priority from U.S. patent application Ser. No. 15/967,354, filed Apr. 30, 2018, entitled COMPUTERIZED SYSTEM AND METHOD FOR IN-VIDEO MODIFICATION, issued as U.S. Pat. No. 11,341,744 on May 24, 2022, and entitled COMPUTERIZED SYSTEM AND METHOD FOR IN-VIDEO MODIFICATION, the contents of which are hereby incorporated by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms through a novel and improved framework for modifying digital content based on detected surfaces within the displayed content.

BACKGROUND

Modern digital content hosting and providing platforms are capable of providing and/or facilitating providing additional third party content to viewing users in a variety of different ways. For example, digital ads can be overlaid atop displayed content, displayed in pop-up windows or displayed in panels or other portions forming part of or adjacent to the user interface (UI) being utilized to view the desired/requested content.

Recently, third party providers (such as, for example, content providers, service providers and digital ad providers, and the like, referred to as, but not limited to, "advertisers" solely for purposes of explanation within the instant disclosure) have attempted to have their proprietary digital content inserted into the video that users are viewing. Such insertion involves performing surface detection and augmentation on the video content to have the advertiser's content added to a specific surface(s) depicted within the content of the video. This is a technically complex technique that requires a large amount of data processing and computational power to parse, identify and insert ads at specific locations within individual frame sets of a video.

Such conventional systems require extensive, and intensive human intervention to ensure that the ads are inserted into the videos at appropriate scenes (i.e., frame sets, also referred to as "shots"). This involves, for example, the identification and modification of the video scenes by a human annotator respective to manually identified tags associated with a specific frame set and a specific set of pixels within each frame of the set (e.g., location within the video, and position within each frame). Additionally, human annotators must ensure that the inserted ads match and satisfy the requirements and expectations of both the content owner (i.e., the owner of the video being annotated with the ad) and the advertiser.

Thus, the manual task conventional systems are employing involves the usage of large amounts of data processing and computational power to perform the manual tasks of annotating a content owner's proprietary content with proprietary content from a third party. Further, such processes are simply skirting the ever-important digital rights management (DRM) requirements of digital content on the Internet—such systems simply leave it up to users (i.e., the human annotators) to acknowledge, accept and/or access read-write instructions within the structure of parties' digital content prior to performing annotations and subsequent merger of separate parties digital content.

SUMMARY

The disclosed systems and methods provide a technical solution to existing technical problems, especially those highlighted above, by providing an improved framework for providing an end-to-end video augmentation system that satisfies content owner and advertiser requirements while efficiently and securely modifying digital content. The disclosed systems and methods provide an improved framework that utilizes previously untapped resources and computational efficiencies provided by computer vision and object recognition techniques in order to perform automatic detection of surfaces in video frames resulting in the creation of a seamless in-video ad experience for viewing users.

As discussed in detail below, the video annotation framework involves creation and matching processes that enable automatic in-video ad insertions. According to embodiments of the instant disclosure, the framework is composed of three main components: i) a content owner's description of qualifying surfaces; ii) a surface detection framework capable of detecting all surfaces that satisfy the content owner's requirements; and iii) an ad matching framework capable of determining, discovering or otherwise identifying qualified advertisements that satisfy both the advertiser and content owner constraints.

Using these components, the disclosed systems and methods produce a new form of ad inventory that operates by leveraging available surfaces in videos to show advertisements in compliance with publisher protection, compliance and policy (i.e., increased content/data security and rights management) in a fully automatic, end-to-end solution. Thus, rather than relying on the computationally slow and excess-data/content driven manual tasks of conventional systems, the disclosed framework provides a streamlined, automatic and computationally efficient process(es) that modifies digital content at the surface level within the frames of the content in compliance with the digital rights of the owners of the content being merged via the augmentation.

In accordance with one or more embodiments, the instant disclosure provides computerized methods for in-video modification based on detected surfaces within the video content via the framework discussed herein, as well as a non-transitory computer-readable storage medium for carrying out the above mentioned technical steps of the framework's in-video modification functionality. The non-transitory computer-readable storage medium has tangibly stored thereon, or tangibly encoded thereon, computer readable instructions that when executed by a device (e.g., application server, content server and/or client device, and the like) cause at least one processor to perform a method for a novel and improved framework to modify a video with third party content by inserting the third party content at or on the surfaces displayed in the video's content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for dynamically integrating digital advertisements into specifically identified portions and/or locations of videos. The disclosed framework provides for the dynamic ad integration based on two bases: i) supporting the requirements of the content owner (e.g., definitions of which surfaces/locations within the video are qualified to be modified/augmented with additional content), and ii) ensuring that the advertisers (the entities providing the augmenting content) have and retain control over which kinds of videos their ads are inserted into, and where within such videos they are inserted.

The disclosed systems and methods, therefore, provide an end-to-end framework that satisfies a parties' rights/requirements—the content owners and the advertisers—thereby ensuring that not only is their content disseminated in their desired manner, but it is also protected against unwanted access and/or modification by unsolicited parties. The disclosed systems and methods execute this framework by using computer vision to create new an ad inventory that creates new revenue opportunities to content owners and new opportunities for brands to reach their audiences. That is, as a result of the implementation of the disclosed framework, content owners are capable of generating new forms of ad revenue while protecting their best interests with regards to their content and their users' experiences. Advertisers have additional networked opportunities to integrate their brand in a seamless fashion into videos while having and maintaining full control over how and where their brand is integrated.

Applications of the disclosed framework can involve processing of a video in any format that is either known or to be known (e.g., any type of file format and/or rendering format). For purposes of this disclosure, the discussion herein focuses on video files; however, this should not be construed as limiting, as any type of known or to be known format of media, whether images or other forms of multimedia, for example, can be utilized without departing from the scope of the instant disclosure.

Figure 1:
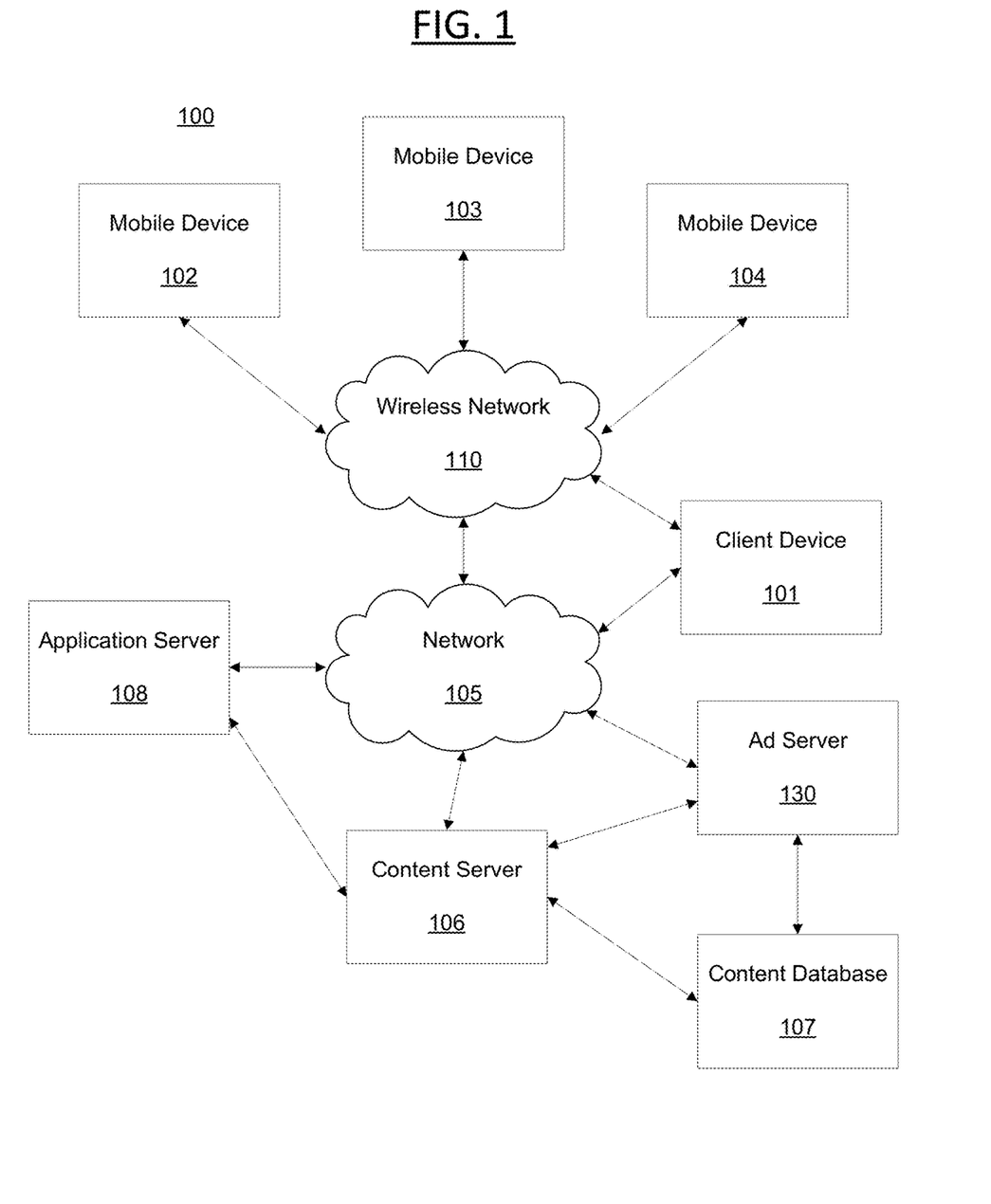
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and advertising ("ad") server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or content server 106 and the like).

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
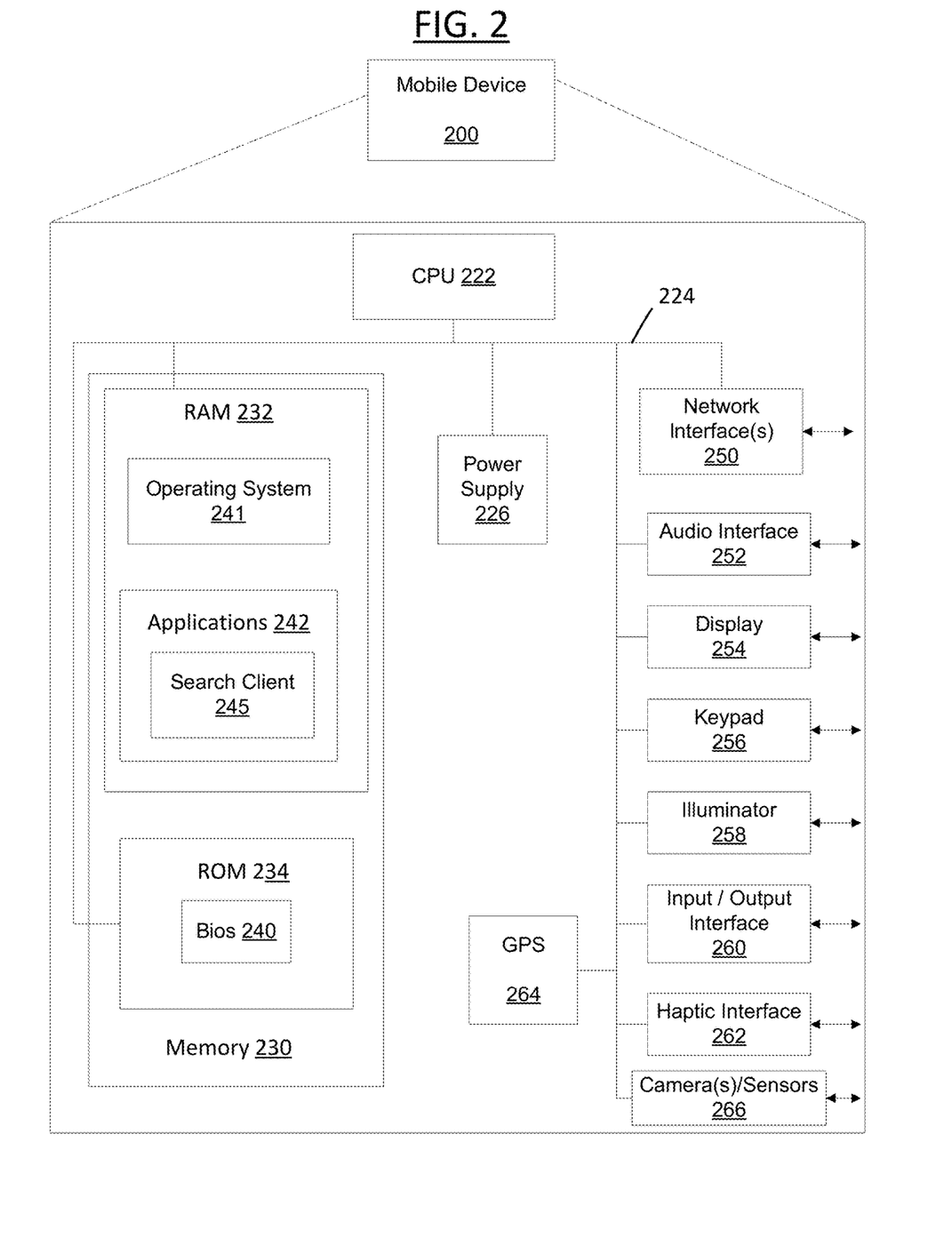
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-8.

Figure 3:
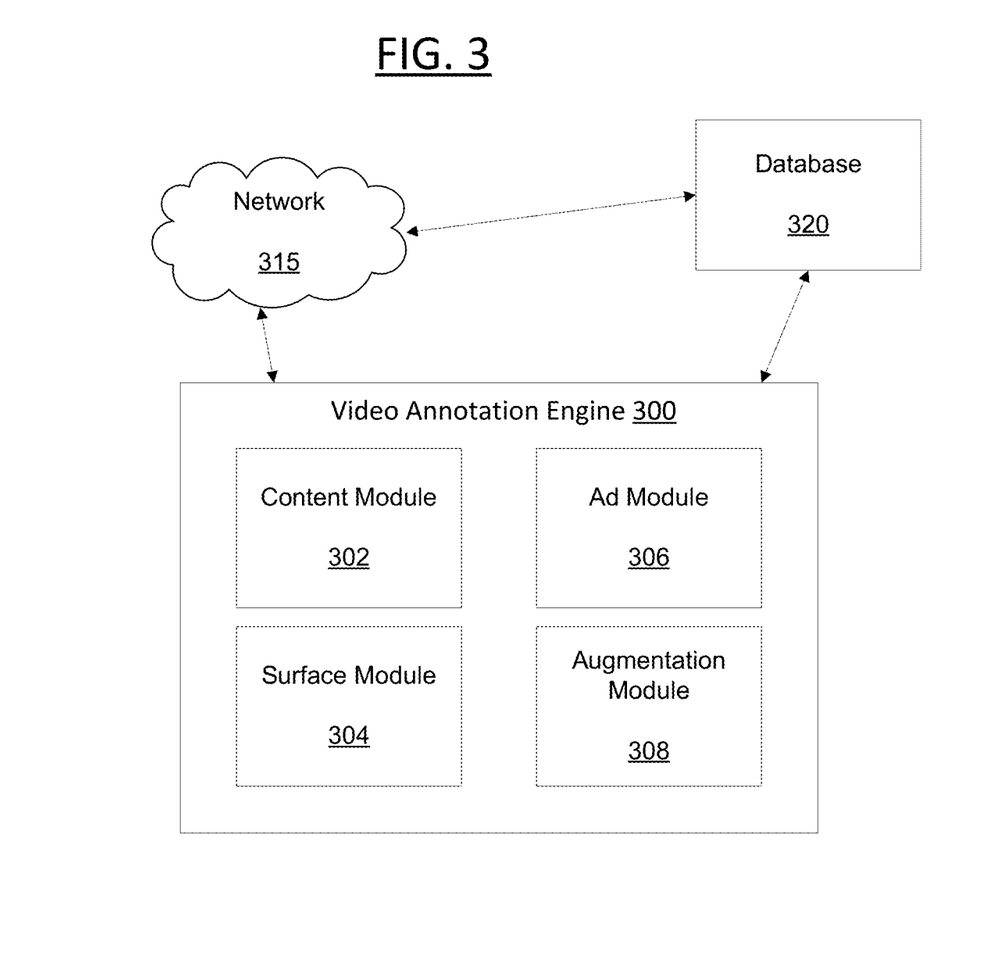
FIG. 3 is a block diagram illustrating components of an exemplary system in accordance with embodiments of the present disclosure.

FIG. 3 is a block diagram illustrating the components for performing the systems and methods discussed herein. FIG. 3 includes a video annotation engine 300, network 315 and database 320. The video annotation engine 300 can be a special purpose machine or processor and could be hosted by an application server, content server, social networking server, web server, search server, content provider, third party server, user's computing device, and the like, or any combination thereof.

According to some embodiments, video annotation engine 300 can be embodied as a stand-alone application that executes on a user device. In some embodiments, the video annotation engine 300 can function as an application installed on the user's device, and in some embodiments, such application can be a web-based application accessed by the user device over a network. In some embodiments, the video annotation engine 300 can be installed as an augmenting script, program or application (e.g., a plug-in or extension) to another media content hosting/serving application (e.g., Yahoo! Sports®, Yahoo! Video®, NFL® Video, NHL® Video, MLB® Video, Hulu®, YouTube®, Verizon® Video, and the like).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of creating, augmenting, modifying, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media and/or service providers and/or platforms. For example, the information can be related to, but not limited to, content type of the video, a category associated with the video, information associated with the pixels and frames of the videos, information associated with the provider of the video, information associated with the activity being depicted in the video, and any other type of known or to be known attribute or feature associated with a video file, or some combination thereof. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Verizon®), by the content/service providers providing video content (e.g., Verizon®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received or analyzed, it can be stored in database 320 as a n-dimensional vector (or feature vector) representation for each video and/or for frames of the video, where the information associated with the video can be translated as a node on the n-dimensional vector. In some embodiments, as digital objects within a video are identified, detected and/or tracked, information corresponding thereto can also be stored in the database 320 in a similar manner. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., streaming, downloadable or on-demand videos), other forms of user generated content and associated information, including for example text, audio, images, multimedia, RSS feed information can be used without departing from the scope of the instant application, which can thereby be communicated and/or accessed and processed by the video annotation engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the video annotation engine 300, and the database of stored resources 320. Indeed, as illustrated in FIG. 3, the video annotation engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as video annotation engine 300, and includes content module 302, surface module 304, ad module 306 and augmentation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
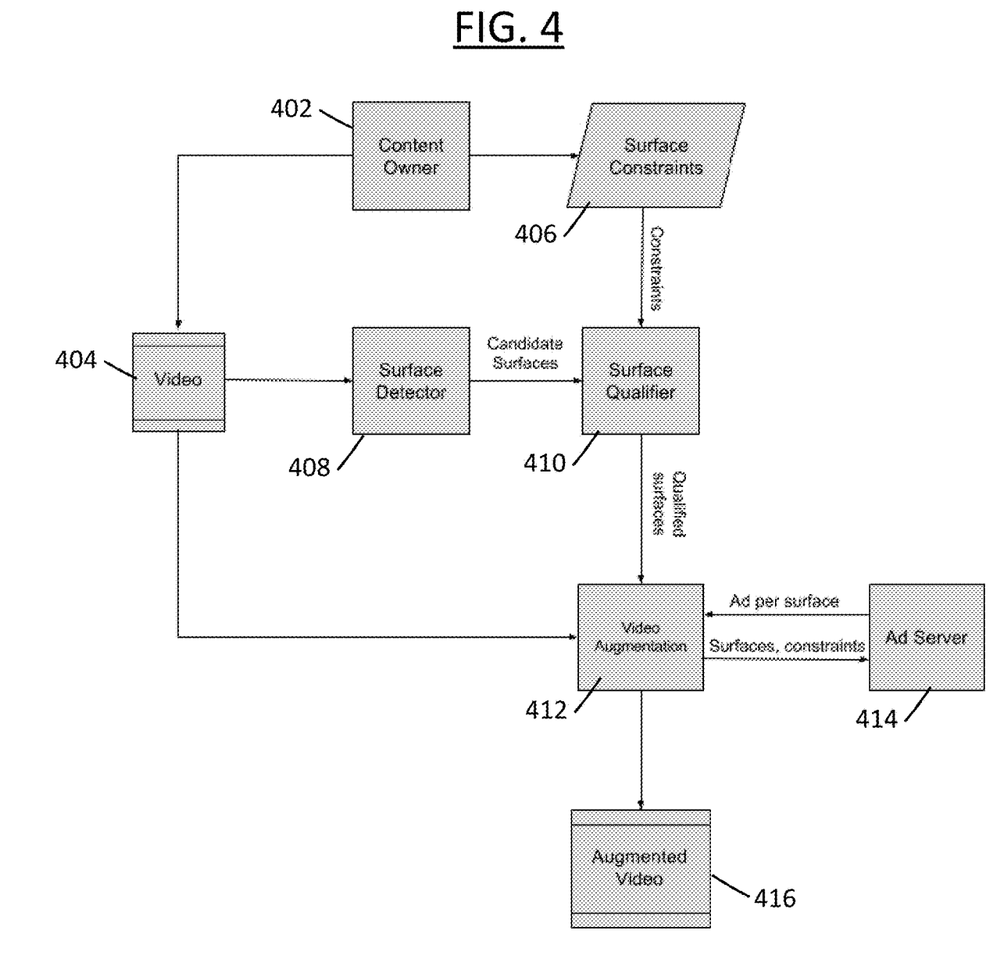
FIG. 4 is a block diagram illustrating a data flow of an exemplary system in accordance with some embodiments of the present disclosure.

Turning to FIG. 4, an overall data flow of the video modification framework is illustrated. The depicted data flow of FIG. 4 (and FIG. 5, as discussed below) provides embodiments where a content owner (CO) provided video is identified for modification with an advertisement, where such modification occurs at the pixel level on a planer surface depicted by the content of the video.

As illustrated in FIG. 4, a CO (item 402) creates, uploads, shares, or otherwise provides a video 404. In some embodiments, the video 404 can be provided by the CO 402 as a result of a request by another user (e.g., the other user searching for and/or specifically requesting the video), or by the CO uploading the video to a platform by which other users can view, edit and/or share with another user set (e.g., uploading the video to Flickr®, Tumblr®, Facebook®, Twitter®, Instagram®, and the like).

Prior to, or during the process of making the video 404 available over a network, the CO 402 can provide surface constraints 406. Such surface constraints 406 are a set of preferences, rules and/or definitions that govern how the video 404 can be modified. According to embodiments of the instant application, the constraints 406 securely dictate the write-access for a specifically identified set of surfaces depicted within the content of the video 404. For example, if the video depicts the inside of a car, then the CO can set constraints that limit, permit or deny access to whether and what types of additional digital content (e.g., an ad, as discussed below) can be inserted into the video for display on the dashboard of the car.

According to some embodiments, the CO provided constraints 406 can be provided as a list of constraints in the form of a text file in JSON format. In some embodiments, the defined constraints can be provided in XML format. As mentioned above, these constraints define which surfaces are pre-qualified (by the CO) for augmentation by third party content.

A non-limiting example set of constraints, which can be set as individual constraints or in combination with each other, for all surfaces or specific surfaces within a video, can include, but are not limited to: scene type (e.g., studio, game, crowd, outdoor, and the like), orientation (e.g., horizontal vs. vertical), dimensions, shape, texture (e.g., smooth vs. pattern vs. random), colors, pixel per frame count, alignments (e.g., horizontal vs. vertical), surface size (e.g., minimum vs. maximum), minimum or maximum number of surfaces per frame, location within the frame, position within the video (e.g., time within the video's duration), type of content depicted within the frame(s) (e.g., whether the depicted content is of a person or place, or associated with other proprietary content), and the like.

For example, an example constraint can be defined as follows:

```
{
   "scenet_type": "studio",
   "orientation": ""horizontal",
   "color": "white",
   "min_size": { "w": 200, "h":100 },
   "max_surfaces": 1
   ....
}
```

Continuing with the data flow of FIG. 4, the video 404 is then processed by surface detector 408 which performs any type of known or to be known surface detection algorithm, technique or mechanism. As discussed herein, according to some embodiments, the surface detector 408 parses and analyzes the video and detects a set of surfaces depicted within the content of the video. In some embodiments, the surface detector 408 identifies all of the surfaces within the video, and in some embodiments, the surface detector 408 detects a number of surfaces that satisfy a minimum threshold, which can be based on features or attributes of the video similar to the constraints discussed above. In some embodiments, the detector 408 can detect each frame and compile them into a manifest for the entire video; and in some embodiments, the manifest can be specific to an individual scene(s) within the video.

Figure 5:
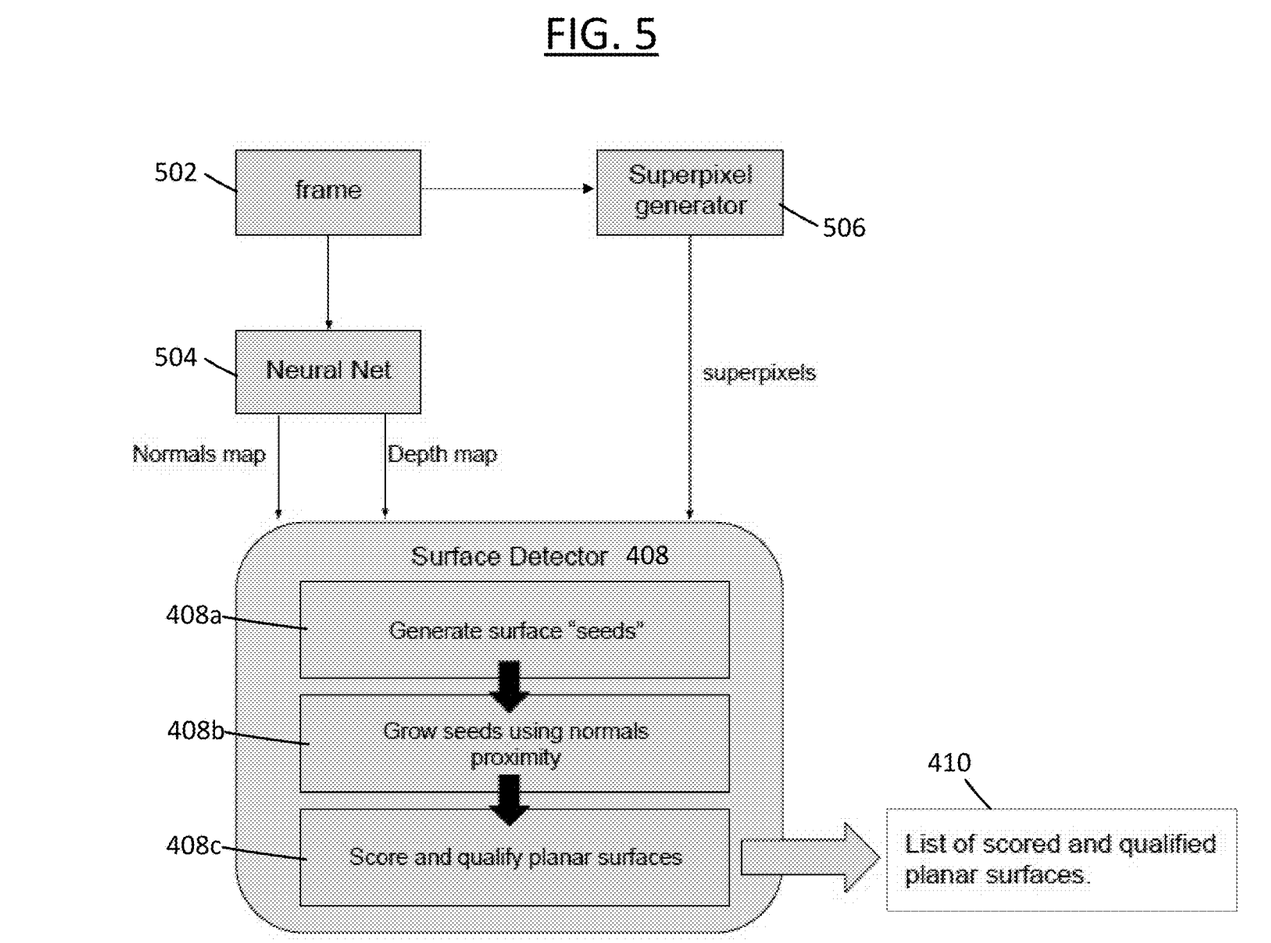
FIG. 5 is a block diagram illustrating a data flow of an exemplary system in accordance with some embodiments of the present disclosure.

An embodiment of the data flow of video processing performed by the surface detector 408 is illustrated in FIG. 5. In FIG. 5, the video 404 is parsed into individual frame sets 502, which can include individual frames (with dimensions m×n) or a number of frames specific to a scene or scenes (each with dimensions m×n). Each frame set 502 is then processed by an executed neural network (e.g., convolution neural network (CNN)) algorithm, technique or mechanism that determines, detects or otherwise identifies each surface depicted therein.

In some embodiments, this involves applying a CNN model to each of the frames of the video (or in some embodiments, the key frames of each scene within the video) which results in parsing and identifying (in some embodiments, extracting) the frame data of the video's frames. Then, upon the identification of the frame data, the detector 408 can execute an object detector and/or optical flow modelling that involves any known or to be known visual recognition model on these inputs, including, for example, the Deformable Parts Model, the Single Shot Detector (SSD), the You Only Look Once (YOLO) detector, and the like. This processing tracks detected surfaces across frame sets (and/or within or across scenes), and produces a manifest of all detected surfaces.

As mentioned above, the manifest can be per video or per scene within a video. The manifest includes information identifying the surface and its attributes according to a normal mapping of the frame data (e.g., an m×n matrix, in which each element is the surface normal for the pixel at a corresponding position), depth mapping of the frame data (m×n matrix, in which each element is a depth (for example, in meters) from the camera to the pixel in the frame) and/or a semantic mapping of the frame data (e.g., and m×n matrix defining dimensions of the elements within each frame). Such mapping can produce information indicating, but not limited to, a timestamp, frame number, surface coordinates, dimensions, depth, surface normal (e.g., a normal (of length 1, for example) vector which is orthogonal to the surface at a certain pixel in a frame), scene in which it appears (e.g., studio, game, outdoors and the like), color, texture and the like (similar to the CO constraints 406).

In some embodiments, the frame set 502 can be additionally subject to image segmentation (referred to as "superpixel generation") by generator 506. According to some embodiments, the generator can execute a computer vision algorithm, technique or mechanism that partitions the digital images of each frame 502 into multiple segments whereby superpixels (e.g., a contiguous group of pixels having similar attributes (within a threshold boundary/range) are identified—for example, the location, contours, boundaries (e.g., lines, curves and the like), edges (via edge detection methods), colors (e.g., RGB attributes), intensities, textures of surfaces, and the like, are detected.

Continuing with the data flow of FIG. 5, the surface detector 408 receives the mappings from the neural network 504 and the superpixels from generator 506, and generates surface "seeds" 408*a*. A "seed" is a pixel in the frame 502 from which the detector 408 can determine/identify a surface. According to some embodiments, as discussed herein, rather than performing a "dense" search for planes within a frame set that considers every pixel, which conventional systems perform that results in inefficient processing times and an overuse of computational resources, the disclosed processing evidences a reduction in processing expenditure and cost by utilizing "seed" pixels from which planes can be derived/determined (referred to as "grown"—grow a surface/plane from data associated with a single pixel/superpixel), as discussed herein.

After identifying the "seeds" of a surface, the detector 408 then utilizes a normals mapping to "grow" them into a detected planar surface, as mentioned above. That is, each "seed" pixel (from the neural network mapping 504) has a corresponding superpixel (from the generator 506 segmentation). Thus, step 408*b* "grows" a seed superpixel by as many other superpixels identified by generator 506 as possible (at least according to a threshold superpixel count), thus identifying a single planar surface. According to embodiments of the disclosure, such "growing" of superpixels is performed by the detector 408 computing the average surface normal for the seed superpixel, then adding its neighboring superpixels recursively if the average surface normal for the neighboring superpixel is oriented in the same direction (indicating that the area in the superpixel is coplanar to the plane that is being grown) within an epsilon of a predetermined value.

In some embodiments, a temporal-smoothing algorithm, technique or mechanism can be applied in order to ensure that the "grown" surfaces satisfy a threshold level of qualities. For example, surfaces that are detected within the video (e.g., within a number of sequential frames) below a threshold number of times can be discarded. In another non-limiting example, the identification of "isolated islands of non-detections" where a surface was not detected within a frame even though a determined number of surrounding frames have surfaces with similar qualities detected therein—in such example, the frame and/or surrounding frames can be discarded thereby ignoring the surface associated therein.

Upon such "growing" being performed, the planar surfaces are scored and qualified 408*c*. That is, each of the n planar surfaces identified (in 408*b*) are scored according to its attributes (identified from 504 and/or 506). Thus, a list of scored and qualified planar surfaces is generated—item 410, as illustrated in FIGS. 4 and 5. As discussed above, the CO provided a listing/set of constraints. Therefore, the scored planar surfaces are qualified by filtering out the planar surfaces that do not satisfy the requirements set by the CO, such that only those surfaces that satisfy the constraints (at least to a defined threshold level) are produced as the listing 410. In some embodiments, a maximum number of qualifying surfaces N are set as qualified—if there are more than N, then those with less similarity to the CO constraints are discarded.

Continuing with the data flow of FIG. 4, having now a list (referred to a manifest) of qualified surfaces (i.e., detected surfaces within the video that satisfy the constraints provided by the CO), the data flow turns to the modification of the video. According to some embodiments, the modification can occur at the server side prior to transmittal to a client device for rendering, or can occur at the client side, where the video and augmenting content is sent together within a communication that results in the video being modified prior to its rendering or during its rendering such that the video is modified as the surface identified to be augmented is rendered (e.g., as the keyframes for the scene are being read by a player, for example).

The video augmentation 412 that occurs involves third parties (e.g., advertisers, as referred herein, but not so limiting as any other entity or party can have their generated content provided for augmentation) targeting or bidding for opportunities to have their provided content added to the video. In the process of targeting in-video ad placements, advertisers can specify various constraints for potentially qualifying surfaces. Advertisers can specify general targeting criteria, such as, for example, a specific content owner, the context, the scene type, size, orientation and duration of a surface in a video, and the like, or some combination thereof. Additionally, advertisers can also specify what color and texture a surface should have in order to qualify a surface, and whether or not additional ads may show next to theirs, and the like, or some combination thereof.

The qualification of whether a surface identified in the manifest (as output from surface qualifier 410) satisfies the advertiser provided constraints is performed in a similar manner as discussed above in relation to determining if identified surfaces satisfy the CO constraints. According to some embodiments, once qualified surfaces specific to the advertiser constraints are detected, their ad placements are sent by the surface detection framework, along with features describing each in-video surface to an ad server 414 for ad matching. In a similar fashion to surface qualification 410 discussed above in relation to CO qualification, the ad server 414 matches the ads that target in-video surfaces (e.g., ads comprising content corresponding to the context of the video, the context of the surfaces depicted therein and/or the user, and the like) and that satisfy the constraints of the advertisers. In some embodiments, once a list of matching ads is created, the ad server may run an auction to select a winning ad that is inserted into the video 404.

At the conclusion of the data flow of FIG. 4, a qualifying ad or an ad tag is returned to the surface detection framework by the ad server 414, whereby, in some embodiments, a verification process can be performed in order to verify that the returned ad qualifies with the CO provided constraints (as described above). If the ad does not qualify, the framework may call the ad server 414 again, otherwise the ad is integrated into the matched surface in the video (item 416) using computer vision techniques, such as, but not limited to, homography and optical-flow, for example.

Figure 6:
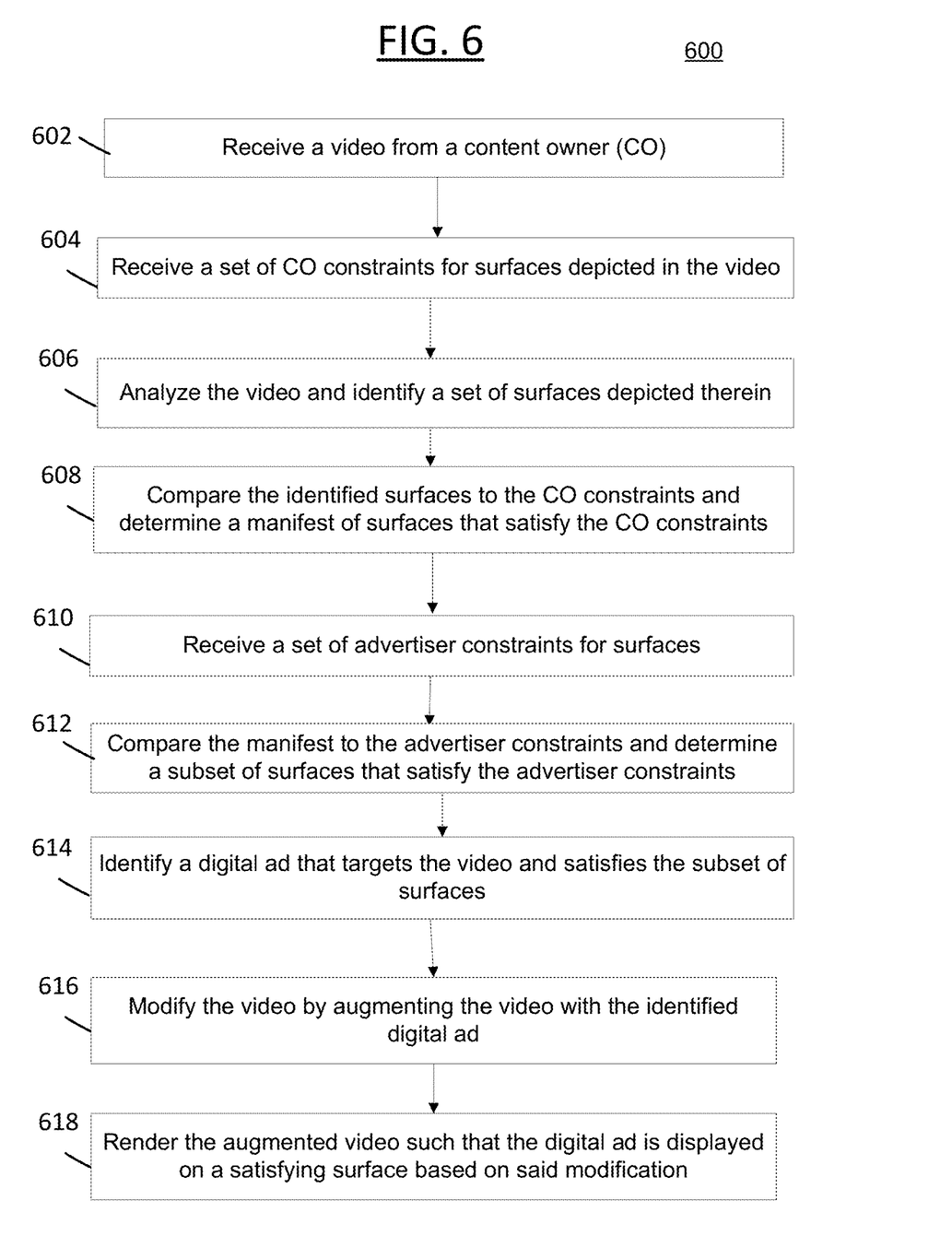
FIG. 6 is flow diagram illustrating steps performed in accordance with some embodiments of the present disclosure.

Turning to FIG. 6, Process 600 further discusses the steps discussed above in relation to the data flows illustrated and discussed in relation to FIGS. 4-5. Process 600 details steps performed in accordance with some embodiments of the present disclosure for modifying a CO provided video file with an advertiser provided digital content item in accordance with constraints/criteria set and/or applied by the CO and advertiser.

Steps 602-604 of Process 600 are performed by the content module 302 of the video annotation engine 300; Steps 606-608 are performed by the surface module 306; Steps 610-614 are performed by the ad module 306; and Steps 616-618 are performed by the augmentation module 308.

Process 600 begins with Step 602 where a video file provided by a CO is received for processing. As discussed above, such processing can be in response to a request from another user or from the CO to render, share or otherwise interact with the video via a media player, on a web page or an application interface. In Step 604, upon the video being received/identified, CO constraints are received/identified that define which surfaces, and their attributes, the CO is permitting and/or denying access to for inclusion of third party content. Such constraints, as discussed above, include information indicating, for example, which types of content can be included in the video, from which providers, and further provide attributes designating specific types of surfaces identifiable within the video.

In Step 606, the video is analyzed and a candidate listing of surfaces is identified. As discussed above, the candidate listing can include a set of all of the surfaces detected in the video, a portion thereof, or a set of surfaces per scene of the video.

In Step 608, the candidate listing of surfaces identified in Step 606 is compared against the CO constraints identified in Step 604, and a determination is made as to a subset of surfaces that satisfy the CO constraints. As discussed above in relation to FIGS. 4 and 5, the surfaces that are identified as comporting with the CO constraints are compiled into a manifest for the video and/or video scene from which they were identified. The manifest is regarded as a set of qualified surfaces, as discussed above in relation to FIGS. 4-5.

In Step 610, a set of constraints from an advertiser(s) is received. The advertiser constraints are in relation to the types of surfaces the advertiser desires to or permits having an ad added to within a video, and in a similar manner as the CO constraints discussed above, they can specify particular attributes/features of the video, the CO, the scene and/or the surfaces depicted therein.

In Step 612, the manifest (determined from Step 608) is compared against the advertiser constraints (received in step 610), and based on this comparison, a subset of surfaces that satisfy the advertiser constraints are identified. As discussed above in relation to FIG. 4, the surfaces that are identified as comporting with the advertiser constraints make up the subset identified in Step 612.

In Step 614, a digital ad(s) that targets and satisfies the subset of surfaces is identified. According to some embodiments, the identification of the digital ad should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. Therefore, while the content is referred as an advertisement (or interchangeably as an ad), it is still a digital media item that is renderable by a computing device, and such digital media item comprises digital content relaying promotional content provided by a network associated third party.

Step 614 involves analyzing the video/scene of video and determining a context, which can be based upon information including, but not limited to, the CO, the requesting user, the social, temporal, spatial and or topical data surrounding the request and/or communication of the video, and/or the attributes of the video, and the like, or some combination thereof. The context serves as the targeting criteria for selecting a particular form of ad content. Thus, according to some embodiments, the ad server can perform (e.g., is caused to perform as per instructions received from the device executing the video annotation engine 300) a search for relevant digital content within an associated content database (e.g., database 107 from FIG. 1) where the search for the content is based at least on the identified context.

Step 614 further involves ensuring that the identified content adheres to the definitions and constraints of the identified surface (from the manifest from Step 608) and the advertiser constraints. Thus, the attributes, definitions and/or content of the identified ad are ensured as complying with the advertiser and CO constraints, such that the content added to the video is permitted by all entities involved. In some embodiments, the ad content item can be modified to conform to the constraints associated with the surface, frame(s), page, and the like, upon which the content item will be displayed, and/or the attributes or capabilities of to the application and/or device for which it will be displayed.

In Step 616, the video is modified based on the identified digital ad. As discussed above in relation to FIG. 4, the video is augmented with the digital ad such that the original video is modified to include the digital ad content. In some embodiments, the modification can include adding a reference (e.g., a pointer) or other data object that references, identifies or otherwise retrieves and inserts the digital ad into the video data/content. Therefore, when the video is rendered, the ad is displayed on the planar surface upon which it was selected for (in Step 614). Thus, in Step 618, the augmented video is rendered according to the augmentation occurring in Step 616.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, by a computing device, a video provided by a first user comprising content having a first set of constraints set by the first user defining write access to a portion of the content, the first constraints further comprising information indicating a maximum number of surfaces per frame that are writable;
    analyzing, via the computing device, the video, and based on the analysis, identifying a first set of surfaces depicted within the content of the video;
    comparing, via the computing device, the identified first set of surfaces and the first set of constraints, and based on the comparison, determining a manifest of surfaces, each surface identified within the manifest having attributes complying with the first set of constraints, the manifest being a number at or below the maximum number of surfaces;
    identifying, via the computing device, a digital content item comprising attributes in compliance with a surface within the manifest;
    modifying, via the computing device, the video using the identified digital content item; and
    communicating, via the computing device, the modified video for rendering at a user computing device, the communication causing the modified video to be rendered such that the identified digital content item is displayed in association with the surface at the user computing device.

2. The method of claim 1, the manifest of surfaces corresponding to the entire video.

3. The method of claim 1, the manifest of surfaces corresponding to one or more individual scenes within the video.

4. The method of claim 1, identifying a digital content item further comprising:
    identifying, via the computing device, a subset of the manifest based on a second set of constraints, the subset comprising surfaces having attributes complying with definitions of the second set of constraints, wherein the surface is identified within the subset of manifest, the identified digital content item comprising attributes in compliance with the surface within the subset defined by the definitions of the second set of constraints.

5. The method of claim 4, further comprising:
    receiving, via the computing device, the second set of constraints from a second user, the second set of constraints comprising the definitions for adding second user provided digital content to surfaces of a video, the identified digital content item used to modify the video being digital content of the second user.

6. The method of claim 5, the definitions of the second set of constraints defining a specific type of surface characteristic each surface must have for adding second user provided digital content.

7. The method of claim 5, the definitions of the second set of constraints defining a specific type of scene a portion of video content must display for adding second user provided digital content.

8. The method of claim 5, the definitions of the second set of constraints defining a specific location of a surface within a set of frames of the video content for adding second user provided digital content.

9. The method of claim 1, the first set of constraints comprising definitions controlling types of content writable to the portion of the content and identifying which surfaces within the portion of the content are writable.

10. The method of claim 1, modifying the video further comprising inserting the identified digital content within the content of the video in association with the surface.

11. The method of claim 1, identifying the digital content item further comprising:
    analyzing the video, and based on the analyzing, determining a context of the video;
    searching a digital content database based on the context; and
    identifying, based on the searching, the digital content item.

12. A non-transitory computer-readable storage medium tangibly encoded with computer-executable instructions that when executed by a processor associated with a computing device perform steps of a method comprising:
    receiving a video provided by a first user comprising content having a first set of constraints set by the first user defining write access to a portion of the content, the first constraints further comprising information indicating a maximum number of surfaces per frame that are writable;
    analyzing the video, and based on the analysis, identifying a first set of surfaces depicted within the content of the video;
    comparing the identified first set of surfaces and the first set of constraints, and based on the comparison, determining a manifest of surfaces, each surface identified within the manifest having attributes complying with the first set of constraints, the manifest being a number at or below the maximum number of surfaces;

identifying a digital content item comprising attributes in compliance with a surface within the manifest;

modifying the video using the identified digital content item; and communicating the modified video for rendering at a user computing device, the communication causing the modified video to be rendered such that the identified digital content item is displayed in association with the surface at the user computing device.

13. The non-transitory computer-readable storage medium of claim 12, the manifest of surfaces corresponding to the entire video.

14. The non-transitory computer-readable storage medium of claim 12, the manifest of surfaces corresponding to one or more individual scenes within the video.

15. The non-transitory computer-readable storage medium of claim 12, identifying a digital content item further comprising:

identifying a subset of the manifest based on a second set of constraints, the subset comprising surfaces having attributes complying with definitions of the second set of constraints, wherein the surface is identified within the subset of manifest, the identified digital content item comprising attributes in compliance with the surface within the subset defined by the definitions of the second set of constraints.

16. The non-transitory computer-readable storage medium of claim 15, the steps further comprising:

receiving the second set of constraints from a second user, the second set of constraints comprising the definitions for adding second user provided digital content to surfaces of a video, the identified digital content item used to modify the video being digital content of the second user.

17. The non-transitory computer-readable storage medium of claim 16, the definitions of the second set of constraints defining a specific type of surface characteristic each surface must have for adding second user provided digital content, the definitions further defining a specific type of scene a portion of video content must display for adding second user provided digital content, and the definitions further defining a specific location of a surface within a set of frames of the video content for adding second user provided digital content.

18. The non-transitory computer-readable storage medium of claim 12, the first set of constraints comprising definitions controlling types of content writable to the portion of the content and identifying which surfaces within the portion of the content are writable.

19. The non-transitory computer-readable storage medium of claim 12, identifying the digital content item further comprising:

analyzing the video, and based on the analyzing, determining a context of the video;

searching a digital content database based on the context; and identifying, based on the searching, the digital content item.

20. A computing device comprising:

a processor; and a non-transitory storage medium for tangibly storing thereon program logic for execution by the processor, the program logic comprising:

logic executed by the processor for receiving a video provided by a first user comprising content having a first set of constraints set by the first user defining write access to a portion of the content, the first constraints further comprising information indicating a maximum number of surfaces per frame that are writable;

logic executed by the processor for analyzing the video, and based on the analysis, identifying a first set of surfaces depicted within the content of the video;

logic executed by the processor for comparing the identified first set of surfaces and the first set of constraints, and based on the comparison, determining a manifest of surfaces, each surface identified within the manifest having attributes complying with the first set of constraints, the manifest being a number at or below the maximum number of surfaces;

logic executed by the processor for identifying a digital content item comprising attributes in compliance with a surface within the manifest;

logic executed by the processor for modifying the video using the identified digital content item; and logic executed by the processor for communicating the modified video for rendering at a user computing device, the communication causing the modified video to be rendered such that the identified digital content item is displayed in association with the surface at the user computing device.

* * * * *